(12) United States Patent
Adam (10) Patent No.: US 8,920,902 B2
(45) Date of Patent: Dec. 30, 2014

(54) HOOK TO HOOK RELEASABLE FASTENER

(75) Inventor: Quentin Arthur Carl Adam, Sydney (AU)

(73) Assignee: Empire Technology Development LLC, Wilmington, DE (US)

( * ) Notice: Subject to any disclaimer, the term of this patent is extended or adjusted under 35 U.S.C. 154(b) by 222 days.

(21) Appl. No.: 13/256,215

(22) PCT Filed: Jun. 14, 2011

(86) PCT No.: PCT/AU2011/000723
§ 371 (c)(1),
(2), (4) Date: Mar. 19, 2012

(87) PCT Pub. No.: WO2012/171053
PCT Pub. Date: Dec. 20, 2012

(65) Prior Publication Data
US 2012/0321837 A1    Dec. 20, 2012

(51) Int. Cl.
| | | |
|---|---|---|
| B32B 3/06 | (2006.01) |
| B23P 11/00 | (2006.01) |
| F16B 45/00 | (2006.01) |
| A44B 18/00 | (2006.01) |
| F16M 13/00 | (2006.01) |
| E04B 1/38 | (2006.01) |
| F16B 5/07 | (2006.01) |
| A47B 97/00 | (2006.01) |

(52) U.S. Cl.
CPC .............. *E04B 1/38* (2013.01); *A44B 18/0007* (2013.01); *A44B 18/0015* (2013.01); *F16M 13/00* (2013.01); *A44B 18/00* (2013.01); *F16B 5/07* (2013.01); *A47B 97/00* (2013.01)
USPC .... 428/100; 24/588.1; 29/525.01; 29/525.03; 428/98

(58) Field of Classification Search
USPC ................. 428/100, 99; 24/588.1; 29/525.03, 29/525.01
See application file for complete search history.

(56) References Cited

U.S. PATENT DOCUMENTS

| | | | |
|---|---|---|---|
| 2,717,437 A | 9/1955 | George de Mestral | |
| 3,009,235 A | 11/1961 | George de Mestral | |
| 4,846,815 A | 7/1989 | Scripps | |
| 5,119,531 A | 6/1992 | Berger et al. | |
| 5,902,427 A * | 5/1999 | Zinke et al. ................. | 156/73.1 |
| 6,159,596 A | 12/2000 | Calhoun et al. | |

FOREIGN PATENT DOCUMENTS

| | | |
|---|---|---|
| EP | 0421295 | 2/1994 |
| EP | 0574863 | 3/1997 |

OTHER PUBLICATIONS

International Search Report for PCT/AU2011/000723 mailed Aug. 11, 2011.
Steel version of velcro 'strong enough to support buildings'; The Telegraph, Nov. 18, 2010, 2 pages.

* cited by examiner

*Primary Examiner* — Brent O'Hern
(74) *Attorney, Agent, or Firm* — Amin, Turocy & Watson, LLP (57) ABSTRACT

Fasteners are generally described. In some examples, a fastener may include at least one hook. The at least one hook may include an arcuate portion and a linking portion. The arcuate portion may be connected by the linking portion to a pivot point. The pivot point may be located with respect to the first member so that, as the linking portion pivots around the pivot point, the arcuate portion moves along an arcuate path between a non-fastening position and a fastening position. In the fastening position the arcuate portion may extend beyond the first member to engage with the second member to secure it to the first member.

26 Claims, 5 Drawing Sheets

HOOK TO HOOK RELEASABLE FASTENER

RELATED APPLICATION

The subject application is a U.S. national stage application of PCT Application Serial No. PCT/AU2011/000723, filed Jun. 14, 2011, and entitled "HOOK TO HOOK RELEASABLE FASTENER," the disclosure of which is incorporated herein by reference in its entirety.

BACKGROUND

Unless otherwise indicated herein, the materials described in this section are not prior art to the claims in this application and are not admitted to be prior art by inclusion in this section.

In prefabricated buildings, components such as internal walls, cabinetry, shelves, fixtures, fittings, etc are erected and fastened together on site, and may be uncoupled for internal space reorganization, for alternative use of space, or for deconstruction and removal of the building.

Permanent fasteners can hinder the uncoupling of components and deconstruction of the building. Also, the use of permanent fasteners may result in the components becoming damaged, requiring repair or replacement.

Hook and loop fasteners require that at least one of the underlying substrates for either the hook portion or the loop portion of the fastener be flexible, to enable one such portion to be peeled away and detached from the other.

SUMMARY

In some embodiments, a fastener component is generally described. An example fastener component may be mounted with respect to a first member to enable the first member to be coupled to a like fastener component. The like fastener component may be mounted with respect to a second member. Each of the fastener component and like fastener component may comprise at least one projecting hook. A distal part of the at least one hook may comprise a generally planar part that faces back generally towards a remainder of the fastener component. The planar part of the at least one hook of the fastener component may be positioned to face a planar part of a hook of the like fastener component whereby coupling of the fastener components can occur.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the drawings.

all arranged according to at least some embodiments described herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally directed, inter alia, to apparatus, methods, systems and members that employ fastener components for securing a first member to a second member (e.g. a first part to a second part).

Briefly stated a fastener component is generally disclosed. An example first fastener component can be mounted to a first member and an example second fastener component can be mounted to a second member. The fastener components can enable the first and second members to be releasably secured together. Each of the example fastener components may comprise at least one projecting hook. A distal part of the at least one hook may comprise a generally planar part that faces back generally towards a remainder of the fastener component. The planar part of the at least one hook of the first fastener component may be positioned to face a planar part of a hook of the second fastener component whereby coupling of the fastener components can occur. When the example first fastener component is mounted to the first member and the example second fastener component is mounted to the second member, the coupling of the fastener components can function to releasably secure the first and second members.

Figure 1:
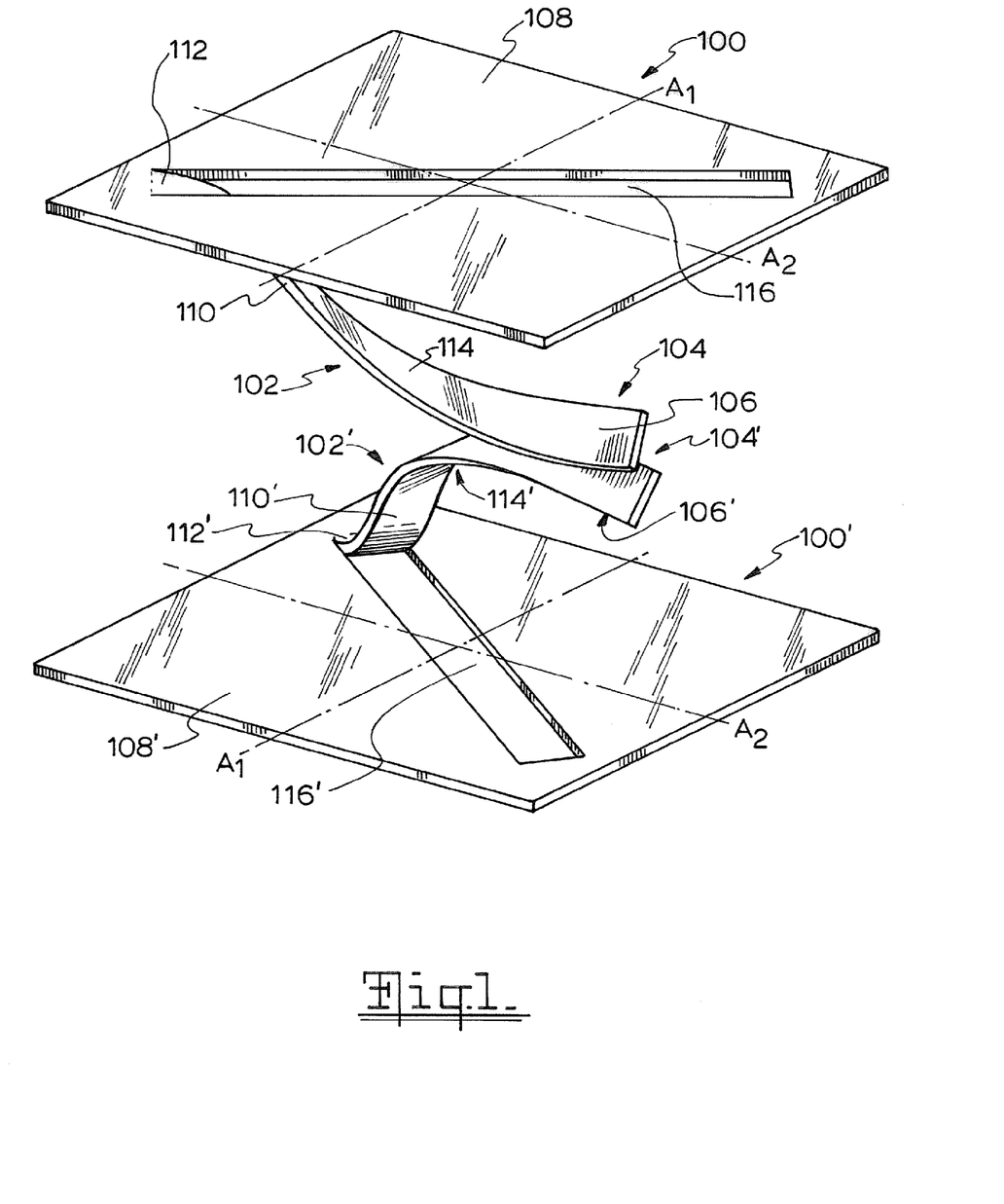
FIG. 1 shows a diagrammatic perspective view of an example fastener component in the form of a single hook unit, being positioned in relation to another example fastener component in the form of a single hook unit.

FIG. 1 is a diagrammatic perspective representation of an example first fastener component 100, and an example second fastener component 100', which are arranged according to at least some embodiments described herein. In FIG. 1 the example fastener components 100, 100' are about to be brought into a coupling position, whereupon they become coupled to each other.

Figure 1A:
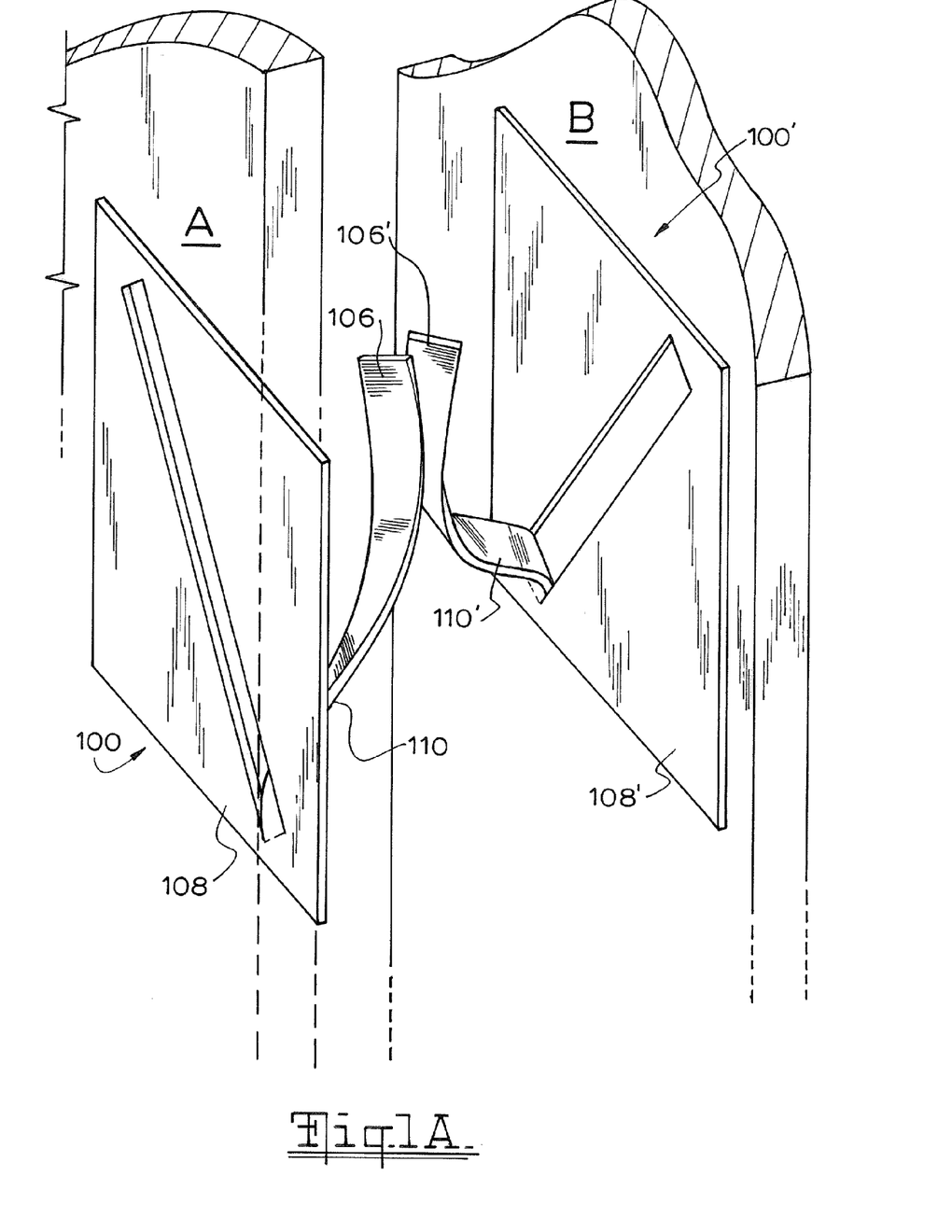
FIG. 1A shows a diagrammatic perspective view of the example fastener components of FIG. 1, being positioned in relation to first and second parts A and B.

FIG. 1A is a diagrammatic perspective representation of the example first and second fastener components 100, 100' of FIG. 1 respectively being positioned (e.g. mounted to) first part A and second part B. The fastener components 100, 100' may be employed to releasably secure the first and second parts A and B together. The first part A may take the form of a wall, door, shelf, fixture, cabinetry, furniture item, wall mounting, fixture, fitting, etc. The second part B may also take the form of a wall, door, shelf, fixture, cabinetry, furniture item, wall mounting, fixture, fitting, etc. In this regard, fastener component 100 can be securely mounted to part A and fastener component 100' can be securely mounted to part B. Such parts A and B may, for example, be found in prefabricated buildings. Such parts A and B may also be found in non-prefabricated buildings (e.g. that are built from the ground up). Like and unlike parts A and B may be releasably secured together using the example fastener components 100, 100'.

It should be appreciated that the example fastener components 100, 100' do not employ a loop arrangement. Rather, the components interact in a hook-to-hook coupling arrangement. It should also be appreciated that the example fastener components 100, 100' are not limited to use with buildings, and may be used to releasably secure together a range of different parts in fields related or unrelated to building. For example, parts to be releasably secured may be found in vehicles, factories, workshops, commercial offices, machinery rooms, domestic dwellings and structures, etc and in outdoor contexts, such as in constructions, structures, arrangements and configurations for sporting, entertainment and cultural events, for outdoor leisure activities, etc. Again, in such contexts, like and unlike parts A and B may be releasably secured together using the example fastener components 100, 100'.

Figure 2:
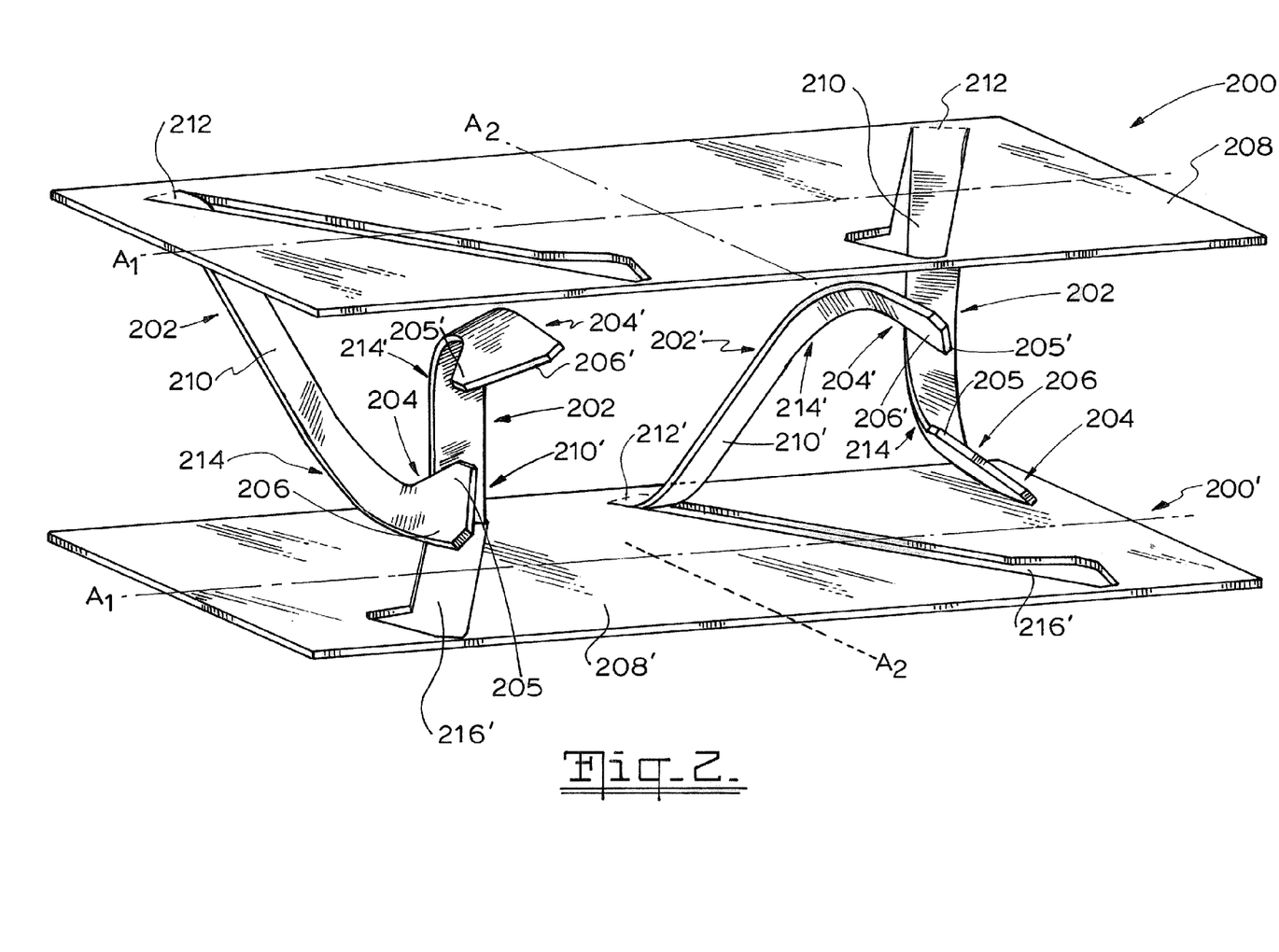
FIG. 2 shows a diagrammatic perspective view of an example fastener component in the form of a double hook unit, being positioned in relation to another example fastener component in the form of a double hook unit.
Figure 3:
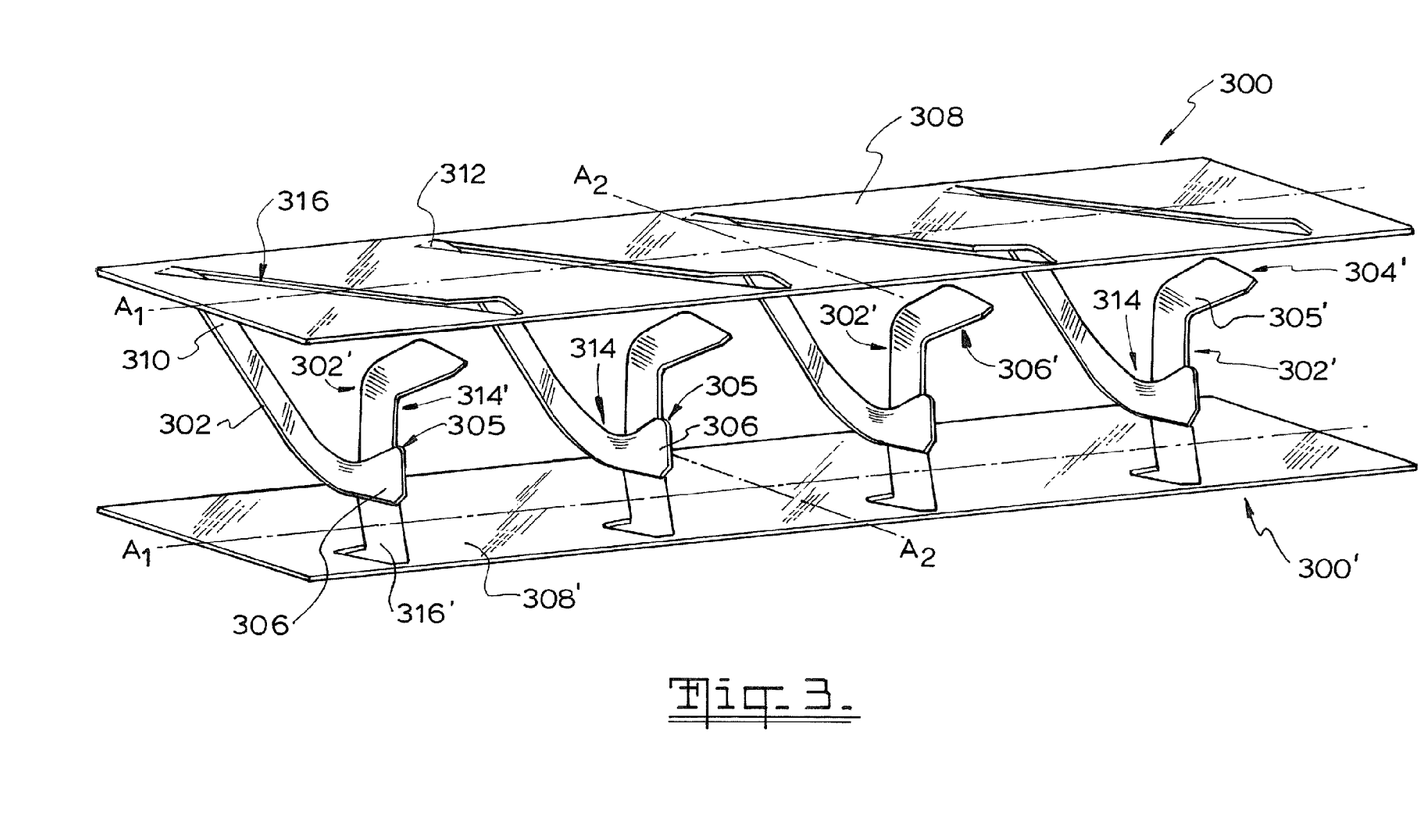
FIG. 3 shows a diagrammatic perspective view of an example fastener component in the form of a multiple hook unit, being positioned in relation to another example fastener component in the form of a multiple hook unit.

Each of the example fastener components 100, 100' has a hook 102, 102' although, as schematically illustrated in FIGS. 2 and 3, each example fastener component may have two or four hooks, or may have three or more than four hooks (e.g. multiple or many hooks). When each example fastener component has multiple or many hooks, the hooks may extend along both the length and width of the component (e.g. in rows and columns of hooks, or in a circular or other pattern, or may even be randomly arranged along both the length and width of the component). The hooks may also be more or less densely packed than illustrated along both the length and width of the component.

Each hook 102, 102' has a distal end 104, 104'. The distal end 104, 104' is shaped and configured to define a generally planar surface 106, 106' that generally faces back towards a base 108, 108' of the fastener component 100, 100'. It should be appreciated that the planar surfaces 106, 106' are not required to be flat in that a general planarity still enables the surfaces 106, 106' to face each other and interact in a coupling arrangement.

Each base 108, 108' depicted in FIG. 1 is square and has first and second axes of symmetry $A_1$ and $A_2$ that each extend between opposing mid-way points of respective opposing sides. Each base 108, 108' of each example fastener component 100, 100' is shown as planar, although could be curved, undulating, or of varying thickness throughout its length, etc to match, for example, a surface of the part A or B to which it is to be mounted. Further, whilst each base 108, 108' is depicted as square, they may each have a rectangular, rhomboidal, trapezoidal, etc shape. Each base may take the form of an elongate strip or sheet.

When planar, each base 108, 108' may be provided with a thickness such that, when each hook 102, 102' is formed out of its respective base 108, 108', the resulting hook thickness allows each of the hooks 102, 102' to resiliently (or elastically) deflect when brought into contact with each other, thereby enabling the hooks 102, 102' to couple.

In each fastener component 100, 100' a proximal part 110, 110' of the hook 102, 102' generally projects away from (i.e. out of the plane of the base) and in a diagonal direction with respect to the base 108, 108'. When each fastener component 100, 100' is viewed in plan orientation, the diagonally projecting direction of the proximal part 110, 110' of each hook is equally (equidistantly) skewed with respect to each of the first and second axes $A_1$ and $A_2$. It can also be seen that each hook 102, 102' is formed out of the plane of the base 108, 108', with a proximal end 112, 112' of the proximal part 110, 110' remaining connected to the base.

When formed, each hook 102, 102' is also generally concave along its length, generally curving so as to face in towards the base 108, 108'. This curvature locates the planar surfaces 106, 106' of the distal ends 104, 104' in an optimal location for coupling. When formed, each hook 102, 102' is also provided with a twist 114, 114' extending intermediately, between the proximal part 110, 110' and distal end 104, 104', of the hook for part of its length. This twist serves to generally offset the planar surfaces 106, 106' to a square facing to the base, so that the distal ends 104, 104' are better able to hook with each other. The offset arrangement of the faces also helps to facilitate the deflection out and hooking back under of the hooks during coupling.

Each hook 102, 102' may be press-cut from or deformed out of the base, whereby each fastener component 100, 100' has an integral construction. This mode of formation defines a remaining slot 116, 116' in the respective bases 108, 108'. Alternatively, though likely to be less desirable for most purposes, each hook may be individually or collectively mounted to the base (e.g. by being screw-mounted, press-fit, swaged, welded, etc to the base).

Prior to coupling the fastener components 100, 100' to each other, the components are arranged such that the proximal part 110 projects in a first diagonal direction with respect to the base 108, and the proximal part 110' projects in a second diagonal direction with respect to the base 108' that is transverse to the first direction (i.e. if the arrangement of FIG. 1 were viewed in plan elevation the slots 116, 116' would be seen to cross over each other). This transverse orientation helps to facilitate the hook-to-hook deflection to enable each hook to deflect out and then to hook back under the other, during coupling of the fastener components 100, 100'.

A series of the base 108 and 108' can respectively be arranged (e.g. in a spaced or abutting relationship) along the parts A and B that are to be releasably secured together.

To couple the fastener components 100, 100', the components are progressively brought together so that the planar surface 106 of fastener component 100 comes into a close facing arrangement with the planar surface 106' of fastener component 100'. In other words, the fastener components 100, 100' are coupled when the distal end 104 of hook 102 hooks under the distal end 104' of hook 102', and vice versa.

Because of the transverse orientation of the hooks 102, 102', when pushed into a coupled configuration, the distal ends 104, 104' are able to contact each other and can easily slide past each other, pushing each other sideways to allow a sliding passage. Once past each other, the resiliently biased nature of the hooks 102, 102' means they spring back to their original shape, to latch or "lock" behind one another. Hooks 102, 102' thus couple together in a hooked configuration wherein the planar surfaces 106, 106' face each other. In general usage of the fastener components 100, 100', the hooks are now not able to be urged out of their hooked configuration.

In this regard, if a force were applied normal to the fastener components 100, 100 (e.g. to pull apart parts A and B), being a direction opposite to the coupling direction of the hooks 102, 102', the orientation of the hooks now provides a substantial resistance to separation (or unlocking) of the hooks. A significantly greater force is required to separate the hooks than that employed to cause the original hooking. Where the fastener components 100, 100' comprise multiple coupled hooks, this separation force is increased proportionally further.

The coupling of the fastener components 100, 100' may be facilitated by guides to ensure optimal alignment of opposing hooks. For example, the guides may take the form of plates or flanges arranged at and optionally around the perimeter of each of the array of hooks in the fastener components 100, 100'. During coupling the opposing plates or flanges of the fastener components 100, 100' can become engaged and guide the components in a predetermined manner to ensure correct hook-to-hook alignment.

In a further alternative, some or all of the hooks may be configured to act as a guide to opposing respective hook(s) during coupling. For example, one or more of the hooks may comprise a projecting flange or lug that is arranged to interact with a projecting flange or lug on a corresponding opposing hook to guide the fastener components 100, 100' into a predetermined alignment. Such guiding arrangements may be employed for fastener components 100, 100' comprising a relative high density of hooks (large, number of hooks over a small area), where it may be important to have alignment prior to coupling.

In a variation, such as for a lower density of hooks the hooks may be manoeuvred into place. In this regard, when the fastener components 100, 100' are brought together, whereby each hook locates into a gap between adjacent hooks, the hooks may be be manoeuvred into place by a relative lateral (or transverse) movement between the fastener components 100, 100'. In such a case, the eventual locking of the hooks can then hold the fastener components 100, 100' in a coupled configuration.

Figure 4:
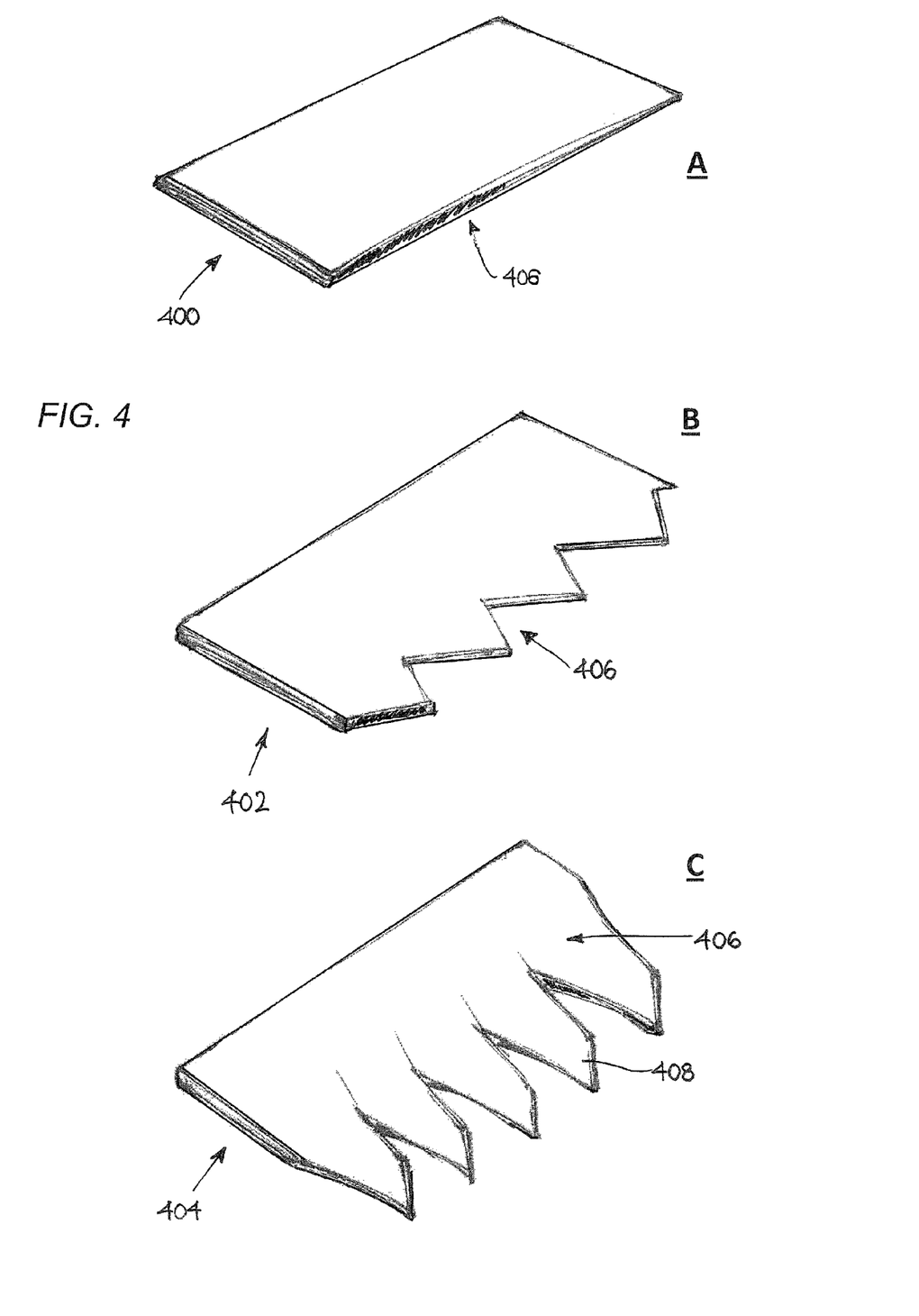
FIGS. 4A to 4C show diagrammatic perspective views of example cleaving tools for use in separating coupled hooks of respective fastener components.

The respective engaged hooks 102, 102' are able to be separated from each other by inserting a planar element between the engaged hooks 102, 102'. FIGS. 4A to 4C show three embodiments of a planar element in the form of three example cleaving tools 400, 402 and 404 for use in separating coupled hooks of respective fastener components;

The example cleaving tool 400 can take the form of an elongate strip of metal such as a blade or spatula having a leading or major edge 406. The example cleaving tool 402 can take the fort of an elongate strip of metal provided with a serrated major edge 406. The example cleaving tool 404 can take the form of an elongate strip of metal provided with downwardly hooked tines 408 along the major edge 406. The major edge 406 may alternatively be fluted. The shaping of the major edge 406 can assist engagement of this edge with each engaged hook pair 102, 102', and can help to facilitate hook separation (unhooking). The shaping of the major edge 406 can be employed to help separate hook distal ends that have a more pronounced hook or barb-like configuration. Such pronounced hook or barb-like configurations can provide a greater degree or hooking or coupling, but may be harder to separate, hence the use of a cleaving tool with a specially shaped major edge 406.

Each example cleaving tool 400, 402 and 404 may be passed between the engaged hooks 102, 102' in a left-to-right direction along the axis $A_2$, being a direction that is normal to a pulling force of the engaged hooks 102, 102'. Alternatively, the example cleaving tool may be passed between the engaged hooks 102, 102' in a left-to-right direction along the axis $A_1$. In each case the leading or major edge 406 is passed between the engaged hooks 102, 102'. The example cleaving tool functions to deflect each of the engaged hooks 102, 102' and thereby disengages the respective facing planar surfaces 106, 106'. This separation is noted to not cause any damage to the hooks 102, 102' and, therefore, the fastener components 100, 100'can be re-used after separation.

FIG. 2 is a diagrammatic perspective representation of another example fastener component 200, and a like fastener component 200', which are arranged according to at least some embodiments described herein. In FIG. 2 the example fastener components 200, 200' as shown are close to reaching the coupling position, whereupon they become coupled to each other.

Again, the example fastener components 200, 200' may be employed to releasably secure a first part A to a second part B, such as the parts outlined above in paragraphs [0012] and [0013].

In this embodiment the example fastener components 200, 200' each have two respective spaced hooks 202, 202' with each hook 202, 202' having an enlarged distal end 204, 204'. In this embodiment, each distal end 204, 204' is shaped to define a hooking projection 205, 205' that projects out from one side of the distal end 204, 204'. The hooking projections 205, 205' again define part of a planar surface 206, 206' at each distal end, but that has an increased surface area for respective inter-engagement of the facing planar surfaces 206, 206' when the fastener components 200, 200' are brought into the coupled position. The triangular shape of each projection 205, 205' also facilitates the hooking interaction between the hooks 202, 202'.

In each example fastener component 200, 200' a proximal part 210, 210' of each of the hooks 202, 202' again generally projects away and out of the plane of the base and in an angled direction with respect to the base 208, 208'. However, moving from left to right along each base 208, 208' the first hook 202 or 202' is angled to project in one direction, and the next hook is angled to project in another direction, as shown. In this regard, the inclination of each slot 216, 216' in the respective bases 208, 208' alternates whereby, when each base is viewed in plan orientation, the diagonally projecting direction of each hook is skewed with respect to each of the first and second axes of symmetry $A_1$ and $A_2$, and in an alternating manner moving along the axis $A_1$. For an elongate fastener component configuration that has multiple hooks, this alternating arrangement can be deployed along the length and breadth of the component.

Prior to coupling the example fastener components 200, 200' to each other, the components are arranged such that the proximal part 210 projects in a first diagonal direction, and the proximal part 210' of its respective hook projects in a second diagonal direction that is transverse to the first direction (i.e. if the arrangement of FIG. 2 were viewed in plan elevation the slots 216, 216' would cross over). As previously explained, this transverse orientation facilitates hook-to-hook deflection to enable each hook to deflect out and then hook under the other, during coupling of the fastener components 200, 200'.

When the hook arrangement shown in FIG. 2 is deployed in multiple rows across each fastener component, the orientation of adjacent hooks in adjacent rows may be the same or may alternate. Otherwise, the configuration, functioning and labelling of the hooks 202, 202' in the example fastener components 200, 200' is generally the same as that described previously for the hooks 102, 102' and hence will not be redescribed.

FIG. 3 is a diagrammatic perspective representation of yet another example fastener component 300, and a like fastener component 300', which are arranged according to at least some embodiments described herein. In FIG. 3 the example fastener components 300, 300' as shown are again close to reaching the coupling position, whereupon they become coupled to each other.

The example fastener components 300, 300' may be employed to releasably secure a first part A to a second part B, such as the parts outlined above in paragraphs [0012] and [0013].

In this embodiment the example fastener components 300, 300' each have four spaced hooks 302, 302', each having an enlarged distal end 304, 304' with a hooking projection 305, 305' that projects out from one side of the distal end 304, 304', to define a planar surface 306, 306' of increased surface area.

Again, a proximal part 310, 310' of each of the respective hooks 302, 302' generally projects away and out of the plane of the base and in an angled direction with respect to the base 208, 208', with the projecting direction of each hook being skewed with respect to the first and second axes of symmetry $A_1$ and $A_2$. However, moving from left to right along each base, each hook 302 or 302' is angled to project in the same direction as each other hook, whereby the inclination of each slot 316, 316' is the same. For an elongate fastener component configuration that has multiple hooks, this arrangement can be deployed along the length and breadth of the component.

Prior to coupling the fastener components 300, 300' to each other, the components are arranged such that the proximal part 310 projects in a first diagonal direction, and the proximal part 310' of its respective hook projects in a second diagonal direction that is transverse to the first direction (i.e. if the arrangement of FIG. 3 were viewed in plan elevation the slots 316, 316' would cross over).

When the hook arrangement shown in FIG. 3 is deployed in multiple rows across each fastener component, the orientation of adjacent hooks in adjacent rows may be the same or may be opposite. Otherwise, the configuration, functioning and labelling of the hooks 302, 302' in the example fastener components 300, 300' is generally the same as that described previously for the hooks 102, 102' and hence will not be redescribed.

The configuration of each of the example fastener components 100, 100', 200, 200', and 300, 300', and the example cleaving tools 400, 402 and 404, enables each of them to be fabricated sheet metal or metal plate, though materials may be employed that are suitable to the given application of the fastener components. The material selected may also relate to the size, purpose and required strength/durability of the example fastener components. For example, the fastener components or cleaving tools may be fabricated from other suitable materials, such as being moulded, woven etc from a plastic or composite material, etc.

When of metal, the metal may comprise a steel alloy, such as stainless steel and/or spring grade steel that has high yield strength, a high yield point and allows large elastic deformation, or be of aluminium, etc. Such metals may be referred to as having a 'springy' quality. When the metal is stainless steel it may comprise grades such as grade 304 or grade 316 which can prevent corrosion and ensure that each fastener component has a sufficient service life (e.g. exceeding the life of a prefabricated building when used in that application).

Other materials suitable for each of the example fastener components 100, 100', 200, 200', and 300, 300', and example cleaving tools 400, 402 and 404, may include engineered plastics such as those employed in the car industry. Such engineered plastics have a high strength and are relatively flexible. Example plastics include polybutylene terephthalate, polycarbonate and blends thereof, each optionally reinforced. For example, a blend of semi-crystalline polyester (e.g. polybutylene terephthalate or polyethylene terephthalate) and polycarbonate, or nylon blends. For applications not requiring a high separation load between the fastener components, commodity plastics such as polyethylene or polypropylene may be employed. The plastic may be injection moulded, and the concave surface of each hook may be 'cored' from a hole in the base of the fastener component, with the perimeter of the hole providing the projection of the hook (e.g. normal to the base).

When of metal, each hook may be die cut and pressed out of sheet metal so that its distal end extends approximately out of the plane of the sheet metal. Each hook may be formed discretely, each on a separate base (as illustrated in FIG. 1), or may be formed as a plurality of hooks pressed from a single base plate in a single stage die-press operation.

When each hook is to be die cut and pressed out of sheet metal, each hook may be about 5 mm in length, but is not limited to this size. In such case, the hook may extend approximately 5 mm out of the plane of the sheet metal. For example, the hooks 102, 102' shown in FIG. 1 may each represent a hook that is formed out of a metal sheet having the dimensions 10 mm by 10 mm and 0.2 mm thick.

When of metal, each example cleaving tool 400, 402 and 404 may be die cut or machined out of sheet metal. When of plastic, each example cleaving tool 400, 402 and 404 may be injection moulded.

The geometry of the hooks may be determined such that the movements they experience when joining/mating and separating/cleaving allows the material from which they are made to experience elastic deformation (i.e. the geometry may be such that the hook may spring back to its original shape). Understanding the relationship between the thickness of the metal, the metal type or grade, and the size of the hook can facilitate such elastic deformation of the hook. For example, if thicker plate material is used the size of each hook may be increased accordingly.

The amount of load in tension and shear that the hooks can carry may also be engineered by modifying the geometry of the hook, the twist in the hook and the thickness of the material. The opposing hooks that interact may comprise non-identical profiles, structural properties and characteristics to alter the manner by which they couple.

In use, one or more of the of the example fastener components 100, 200 and/or 300 is mounted to a first part A, and one or more of the example fastener components 100', 200' and/or 300' is mounted to a first part B (FIG. 1A). For example, each of the fastener components can be mounted at or along a face or surface (such as at an edge) of each of the first and second parts A and B. Such surfaces may be non-planar and non-contiguous (e.g. the "surface" may be defined by two faces intersecting at a corner). Thus, the fastener components can be employed to releasably secure together respective opposing or adjacent faces or surfaces of the first and second parts A and B.

The orientation of the components after mounting is such that a direction of projection of a given hook 102, 202 or 302 on the fastener component 100, 200 or 300 is opposite to a direction of projection of its corresponding hook 102', 202' or 302' on the other fastener component 100', 200' or 300'. As explained above, this assists with the deflection and coupling of the opposing hooks. This orientation may generally occur at the time of mounting each fastener component to its respective part A or B.

The appropriately facing fastener components are then brought (e.g. urged) together so that the hook distal ends hook(s) 104, 204 or 304 engage with the corresponding hook distal ends 104', 204' or 304' to cause each hook to be deflected out, so that the distal ends move past each other. Once past, the distal ends may then deflect back in, so that the planar part 106, 206 or 306 of each hook comes into a close-facing position with the planar part 106', 206' or 306' of its corresponding hook. In this orientation, the hooks become hooked together and the fastener components become coupled, whereby the first and second parts A and B become releasably secured together.

Each fastener component can be mounted and secured to its respective part A or B by a chemical adhesive or by one or more mechanical fasteners (e.g. screws such as self-fastening screws; bolts; projecting burrs or tangs (such as employed on nail plates); etc). For example, when each fastener component is elongate, it can be progressively and sequentially mounted along its length to its respective part A or B, such as by being pressed by a tool, forced by a hammer or mallet, etc.

When each fastener component is elongate, it may be supplied in a rolled or strip form, whereby it can be progressively rolled out and sequentially mounted along its length to its respective part A or B. When attached by chemical adhesive, the adhesive can be pre-applied to an underside of a base of each fastener component, covered by a removable membrane or film. When attached by mechanical fasteners, a suitable number of these can be supplied together with each fastener component, and together with separate or "integrated" directions for use (e.g. printed or marked onto each component and optionally onto parts A and B).

Each of the respective parts A or B can be pre-fabricated with the example fastener components 100, 100', 200, 200', or 300, 300' already secured thereto, or the fastener components can be attached on site to the respective parts A or B.

While the above description is concerned with fastener components for use in buildings (prefabricated and built on site) it will be understood that the fastener components are not limited to such applications. For example, they may be used to secure together two parts or components in cabinetry, furniture, vehicles, factories, workshops, commercial offices, machinery rooms, dwellings and structures, other constructions, structures, and outdoor arrangements, etc.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). Further, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a fastener having at least one of A, B, and C" would include but not be limited to fasteners that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a fastener having at least one of A, B, or C" would include but not be limited to fasteners that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into sub-ranges as discussed above. Finally, as will be understood by one skilled in the art, a range includes each individual member.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods which can, of course, vary. It is also to be understood that the terminology used herein is for the purpose of describing particular embodiments only, and is not intended to be limiting.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. A fastener component that is able to be coupled to a like fastener component, the fastener component comprising:
   at least one projecting hook, with a distal part of the at least one projecting hook comprising a planar part that faces back towards a remainder of the fastener component, wherein the at least one projecting hook comprises a twist defined intermediate a proximal part of the at least one projecting hook and the distal part resulting in the planar part being offset to a square facing of a base of the fastener component;
   wherein the planar part of the at least one projecting hook of the fastener component is able to be positioned to face another planar part of another projecting hook of the like fastener component whereby coupling of the fastener component and the like fastener component occurs.

2. The fastener component of claim 1, wherein the at least one projecting hook projects with respect to the base, with the proximal part of the at least one projecting hook projecting in a direction away from the base.

3. The fastener component of claim 2, wherein the base of the fastener component is planar.

4. The fastener component of claim 3, wherein the proximal part of the at least one projecting hook projects in the direction away from a plane of the base.

5. The fastener component of claim 4, wherein the at least one projecting hook is formed out of the plane of the base, with a proximal end of the proximal part of the at least one projecting hook remaining connected to the base.

6. The fastener component of claim 1, wherein the at least one projecting hook is press-cut from or deformed out of the base.

7. The fastener component of claim 1, wherein the at least one projecting hook is, along its length, generally concave so as to face in towards a remainder of the fastener component.

8. The fastener component of claim 1, wherein the distal part of the at least one projecting hook is laterally enlarged relative to a remainder of the at least one projecting hook.

9. The fastener component of claim 8, further comprising a projection along one side of the distal part of the at least one projecting hook resulting in the distal part of the at least one projecting hook being laterally enlarged.

10. The fastener component of claim 1, wherein the base is square or rectangular, having first and second axes of symmetry that each extend between opposing mid-way points of respective opposing sides; and
   wherein, when the base is viewed in a plan orientation, the at least one projecting hook projects from the base in a direction that is skewed with respect to each of the first and second axes.

11. The fastener component of claim 1, wherein the at least one projecting hook comprises a plurality of projecting hooks.

12. The fastener component of claim 11, wherein the base is a rectangular base that defines first and second axes of symmetry extending between opposing mid-way points of respective opposing sides, and the plurality of hooks are spaced along the rectangular base.

13. The fastener component of claim 12, wherein a first direction of a given projecting hook of the plurality of projecting hooks is skewed in one way with respect to each of the first and second axes; and a second direction of a next adjacent projecting hook of the plurality of projecting hooks is skewed in an alternate way with respect to each of the first and second axes; with this alternating skew pattern repeating for other projecting hooks of the plurality of projecting hooks along the rectangular base.

14. The fastener component of claim 1, wherein the at least one projecting hook of the fastener component is formed from a deflectable material, whereby respective projecting hooks of the at least one projecting hook of the fastener component and at least one other projecting hook of the like fastener component are able to be moved against each other to deflect and engage, whereby the planar part of the at least one projecting hook of the fastener component faces another planar part of a corresponding projecting hook of the at least one other projecting hook of the like fastener component.

15. The fastener component of claim 14, wherein the respective projecting hooks, once engaged, are able to be separated from each other by inserting a planar element between the respective projecting hooks, so as to deflect the respective projecting hooks and thereby disengage the planar part and the other planar part.

16. The fastener component of claim 1, wherein the fastener component is formed from a metal sheet or plate.

17. A method, comprising:
   mounting a fastener component to a first member and mounting a like fastener component to a second member, the fastener component comprising at least one projecting hook and the like fastener component comprising at least one like projecting hook, with a distal part of the at least one projecting hook comprising a planar part that faces back towards a remainder of the fastener component and another distal part of the at least one like projecting hook comprising another planar part that faces back towards a remainder of the like fastener component, wherein the at least one projecting hook comprises a twist defined intermediate a proximal part of the at least one projecting hook and the distal part resulting in the planar part not squarely facing a base of the fastener component or another base of the like fastener component, and wherein the planar part of a projecting hook of the at least one projecting hook of the fastener component is able to be positioned to face the other planar part of another projecting hook of the at least one like projecting hook of the like fastener component, whereby the fastener component and the like fastener component in a configuration to couple;
   orienting the fastener component and the like fastener component on the first and second members whereby a first direction of projection of the projecting hook on the fastener component is opposite to a second direction of projection of the other projecting hook on the like fastener component; and
   facing and bringing together the fastener component and the like fastener component on the first and second members whereby the planar part of the projecting hook of the fastener component is positioned to face the other planar part of the other projecting hook of the like fastener component, whereby coupling of the fastener component and the like fastener component and thus the first and second members occurs.

18. The method of claim 17, wherein the fastener component is mounted to the first member and the like fastener component is mounted to the second member by a chemical adhesive or one or more mechanical fasteners.

19. The method of claim 17, wherein the fastener component is elongated and mounted along a first length of the first member, and the like fastener component is elongated and mounted along a second length of the second member.

20. The method of claim 17, wherein the orientation of the fastener component and the like fastener component on the first and second members occurs at the time of the mounting.

21. The method of claim 17, wherein the fastener component and the like fastener component are mounted at or along respective faces on the first and second members, whereby the first and second members are coupled together by the fastener component and the like fastener component at the respective faces of the first and second members.

22. An apparatus, comprising:
a first member having mounted thereto a fastener component that is able to be mounted with respect to the first member to enable the first member to be coupled to a like fastener component that is itself able to be mounted with respect to a second member, the fastener component and the like fastener component respectively comprising at least one projecting hook, with a distal part of the at least one projecting hook comprising a planar part that faces back towards a remainder of the fastener component or the like fastener component, wherein the at least one projecting hook comprises a twist defined intermediate a proximal part of the at least one projecting hook of the fastener component and the distal part of the at least one projecting hook of the fastener component resulting in the planar part not having a square facing to a respective base of the fastener component or the like fastener component, and wherein the planar part of a projecting hook of the at least one projecting hook of the fastener component is able to be positioned to face the planar part of a projecting hook of the at least one projecting hook of the like fastener component whereby coupling of the fastener component and the like fastener component can occur; and
the second member having mounted thereto the like fastener component.

23. A system, comprising:
a fastener component mounted on a first member and a like fastener component mounted on a second member, the fastener component and the like fastener component respectively comprising at least one projecting hook, with a distal part of the at least one projecting hook comprising a generally planar part that faces back generally towards a first remainder of the fastener component or a second remainder of the like fastener component, wherein the at least one projecting hook comprises a twist defined intermediate a proximal part of the at least one projecting hook of the fastener component and the distal part of the at least one projecting hook of the fastener component resulting in the planar part being angled away from a square facing to a respective base of the fastener component or the like fastener component, and wherein the planar part of a projecting hook of the at least one projecting hook of the fastener component is able to be positioned to face the planar part of another projecting hook of the at least one projecting hook of the like fastener component whereby the fastener component is configured to couple with the like fastener component; and
a chemical adhesive or one or more mechanical fasteners configured to mount the fastener component to the first member and the like fastener component to the second member.

24. The system of claim 23, wherein the fastener component and the like fastener component are elongated and supplied in a rolled or strip form.

25. The system of claim 23, wherein:
the chemical adhesive is pre-applied to an underside of respective bases of the fastener component and the like fastener component; or
the one or more mechanical fasteners are supplied with the fastener component and the like fastener component.

26. The system of claim 25, wherein the chemical adhesive is covered by a removable membrane or film.

\* \* \* \* \*

UNITED STATES PATENT AND TRADEMARK OFFICE
CERTIFICATE OF CORRECTION

PATENT NO. : 8,920,902 B2  
APPLICATION NO. : 13/256215  
DATED : December 30, 2014  
INVENTOR(S) : Adam Page 1 of 1

It is certified that error appears in the above-identified patent and that said Letters Patent is hereby corrected as shown below:

In the Specification

In Column 1, Line 5, delete "stage application" and insert -- stage application filing under 35 U.S.C. §371 --, therefor.

In Column 4, Line 55, delete "100, 100" and insert -- 100, 100' --, therefor.

In Column 5, Line 14, delete "(large," and insert -- (large --, therefor.

In Column 5, Line 18, delete "hooks" and insert -- hooks, --, therefor.

In Column 5, Line 22, delete "may be be" and insert -- may be --, therefor.

In Column 5, Line 32, delete "components;" and insert -- component. --, therefor.

In Column 5, Line 36, delete "fort" and insert -- form --, therefor.

In Column 5, Line 57, delete "ma;or" and insert -- major --, therefor.

In Column 7, Line 36, delete "fabricated" and insert -- fabricated from --, therefor.

Signed and Sealed this  
Twenty-sixth Day of May, 2015

Michelle K. Lee  
*Director of the United States Patent and Trademark Office*